United States Patent
Kaegi et al.

(10) Patent No.: US 7,218,698 B2
(45) Date of Patent: May 15, 2007

(54) SYNCHRONIZATION CIRCUIT

(75) Inventors: Daniel Kaegi, Rueti (CH); Heinz Mathis, Uerikon (CH); Andreas Thiel, Wilen b. Wollerau (CH)

(73) Assignee: u-blox ag, Thalwil (CH)

( * ) Notice: Subject to any disclaimer, the term of this patent is extended or adjusted under 35 U.S.C. 154(b) by 704 days.

(21) Appl. No.: 10/618,051

(22) Filed: Jul. 14, 2003

(65) Prior Publication Data

US 2004/0120440 A1    Jun. 24, 2004

(30) Foreign Application Priority Data

Dec. 24, 2002  (EP) ................................ 02406140

(51) Int. Cl.
  *H03D 3/24*   (2006.01)
(52) U.S. Cl. ..................................... 375/376
(58) Field of Classification Search ................ 375/354, 375/365, 367, 376, 130, 141; 708/252
See application file for complete search history.

(56) References Cited

U.S. PATENT DOCUMENTS

| | | | |
|---|---|---|---|
| 5,612,973 A * | 3/1997 | Gershenfeld ................. | 375/141 |
| 5,737,360 A * | 4/1998 | Grinstein et al. ............ | 375/141 |
| 5,987,080 A * | 11/1999 | Berghager et al. .......... | 375/354 |
| 6,724,805 B1 * | 4/2004 | Vigoda ........................ | 375/130 |

FOREIGN PATENT DOCUMENTS

WO    WO 01/37441    5/2001

* cited by examiner

*Primary Examiner*—Khanh Tran
(74) *Attorney, Agent, or Firm*—Oblon, Spivak, McClelland, Maier & Neustadt, P.C.

(57)    ABSTRACT

A sychronization circuit comprising an analog feedback shift register for generating an internal sequence which is synchronized with an external sequence containing repetitions of a fundamental sequence has a feedback circuit which, for the formation of a new value of a fundamental sequence, combines at least two values $(x_1, x_2)$ stored in the shift register according to a feedback function $(f(x_1, x_2))$, which is then scaled with a factor k, $0.9 < k < 0.99$. The synchronization behaviour is improved, especially in the case of signals with strong background noise, by using a feedback function which is substantially linear in the sectors defined by the signs of the arguments and whose sign corresponds to that of the negative of the product of the negative arguments and whose magnitude is 1 if the magnitudes of the arguments are each 1. A function which meets these requirements and has proved useful is $f(x_1, \ldots, x_m) = -\text{sig}((-x_1) \cdot \ldots \cdot (-x_m)) \cdot (|x_1| + \ldots + |x_m|)/m$. For improving the signal/noise ratio, there is a buffer in front of the analog feedback shift register, where, for the generation of the external sequence, segments of an input sequence which contain several, e.g. twenty, successive instances of the fundamental sequence are added and then read out repeatedly.

11 Claims, 3 Drawing Sheets

SYNCHRONIZATION CIRCUIT

FIELD OF THE INVENTION

The invention relates to a synchronization circuit according to the precharacterizing clause of claim 1. Such synchronization circuits can be used for the production of an internal sequence of analog values which corresponds to an external sequence coded in a received signal and containing in each case repetitions of a binary fundamental sequence and which is synchronous with said external sequence, as required, for example, in the decoding of signals in communications technology, in particular of mobile telephony, and in positioning systems, such as GPS.

PRIOR ART

Various synchronization circuits of the generic type with a feedback function based on the cosine and square functions are known (U.S. Pat. Nos. 5,579,337, 5,612,973, WO-A-01/37 441), the synchronization behaviour of which, however, is unsatisfactory in many cases and which cannot be used in the case of signals with high background noise.

SUMMARY OF THE INVENTION

It is the object of the invention to provide a synchronization circuit of the generic type which has more advantageous synchronization behaviour than the known synchronization circuits of the generic type. This object is achieved by the features in the characterizing clause of Claim 1.

The synchronization circuit according to the invention generally synchronizes rapidly and without problems, and, something which is of decisive importance in many practical applications, also under unfavourable conditions, such as a weak signal and strong disturbances. Thus, satisfactory synchronization behaviour sufficient for practical purposes could also be achieved in the case of large negative signal/noise ratios.

BRIEF DESCRIPTION OF THE DRAWINGS

The invention is explained in more detail below on the basis of figures which show only an embodiment.

DESCRIPTION OF THE PREFERRED EMBODIMENTS

Figure 1:
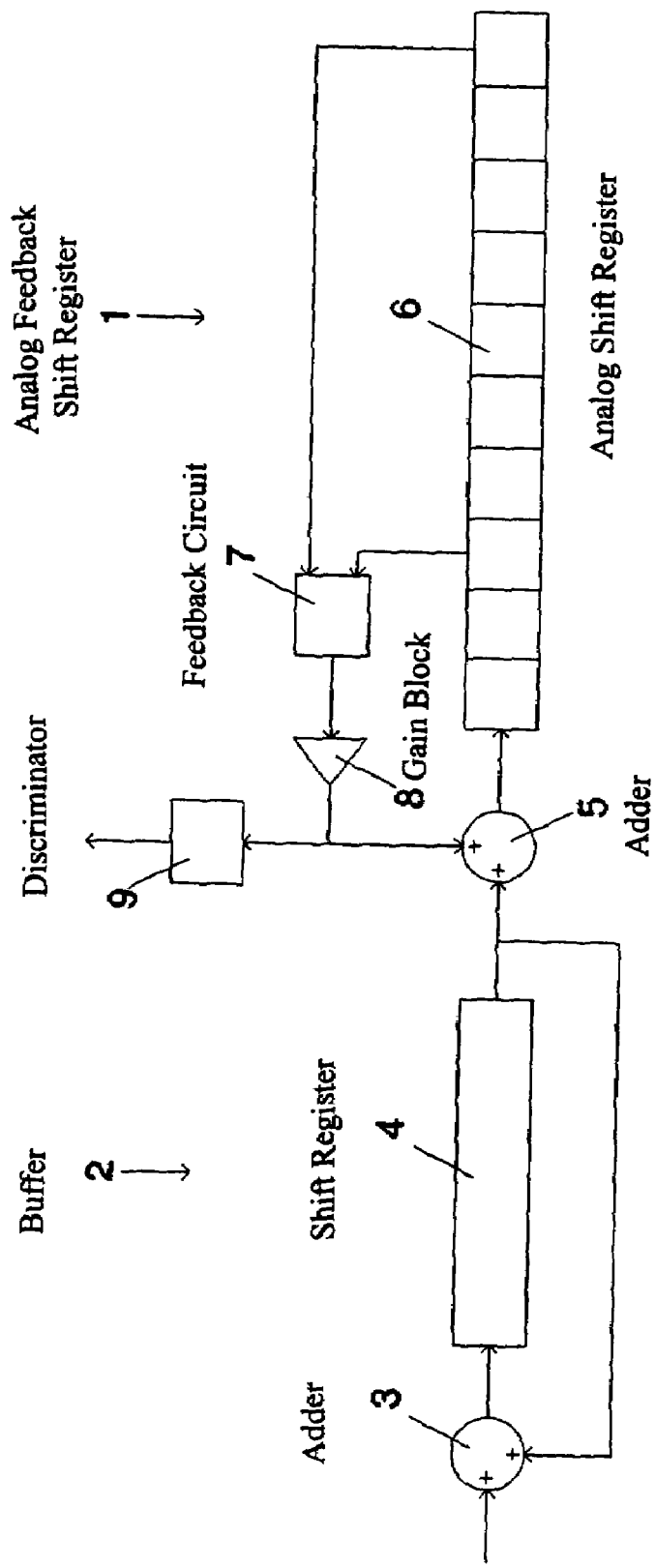
FIG. 1 shows a synchronization circuit according to the invention.

The synchronization circuit according to the invention is suitable for all applications in which data are transmitted CDMA-coded. It can be used directly for processing an external signal derived from a received signal if the fundamental sequence is an m-sequence, but use for processing CDMA-coded signals which use other types of fundamental sequences, such as, for example, Gold sequences or Kasami sequences, is also possible.

Each m-sequence can be generated by a binary feedback shift register of length n and has, inter alia, the property that, with one exception, each sequence of a length n—in the case presented below as an example, n is 10—occurs exactly once in the m-sequence of length $N=2^n-1$—in this case 1023.

Various representations are possible for the binary quantities and their logic operators. Most familiar is the representation by 0 and 1 with the addition modulo 2 (also known as exclusive-or logical combination) $(b_1,b_2) \rightarrow b_1 \oplus b_2$ as both an associative and a commutative relationship, according to the following table:

| | $b_1$ | |
|---|---|---|
| $b_2$ | 0 | 1 |
| 0 | 0 | 1 |
| 1 | 1 | 0 |

The logical combination of an element with the zero element 0 leaves the former unchanged while the logical combination with 1 converts 0 into 1 and 1 into 0.

The Transformation $$b \rightarrow p = 2b - 1 \qquad (1)$$

leads to the following representation, which is equivalent but more easily implemented and which is used in the embodiment:

| | $p_1$ | |
|---|---|---|
| $p_2$ | -1 | 1 |
| -1 | -1 | 1 |
| 1 | 1 | -1 |

Here, the logical operation is produced by the mapping $$(p_1, p_2) \rightarrow p_1 \oplus p_2 = -p_1 \cdot p_2. \qquad (2)$$

-1 is the zero element. The logical operation can evidently be readily extended to include any real numbers, i.e. analog values.

Each m-sequence $p_1, \ldots, p_N$ with $N = 2^n - 1$ can be generated, starting from an initial sequence $p_1, \ldots, p_n$ of length n which does not consist exclusively of zero elements, by recursively forming further values according to the pattern:

$$p_i = p_{i-n} \oplus p_{i-rm} \oplus \ldots \oplus p_{i-r1}, \qquad (3)$$

where $0 < r_1 < \ldots r_m < n$ and the polynomial $x^n + x^{rm} + \ldots + x^{r1} + 1$ is prime with respect to the arithmetic defined above. For example, in each case $$p_i = p_{i-10} \oplus p_{i-3} \qquad (4)$$

may apply. Since all N possible segments of length n, apart from the segment consisting only of zero elements, are passed through before the initial sequence recurs, the choice of the latter is of no importance.

Figure 3:
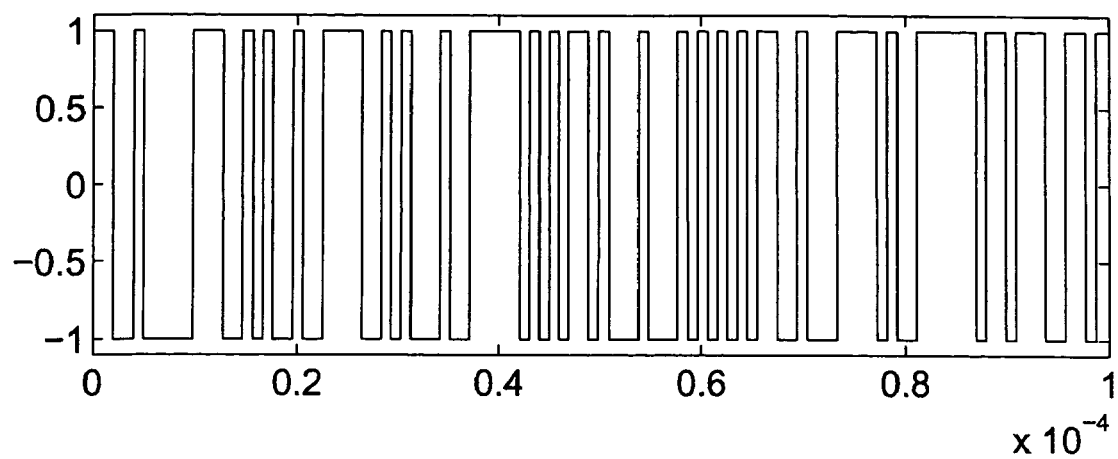
FIG. 3 shows a section of a possible fundamental sequence and FIG. 4 shows the development of the power of a feedback signal in the sychronization circuit according to the invention during a synchronization.

On transmission of CDMA-coded data, each transmission channel is characterized by a specific fundamental sequence which is repeated constantly. A section of a possible fundamental sequence is shown in FIG. 3. For each data bit, usually several, e.g. twenty, copies of the fundamental sequence are transmitted. They are logically combined with the respective data bit so that the fundamental sequence occurs either in unchanged form or is inverted, depending on the value of said data bit.

Figure 2:
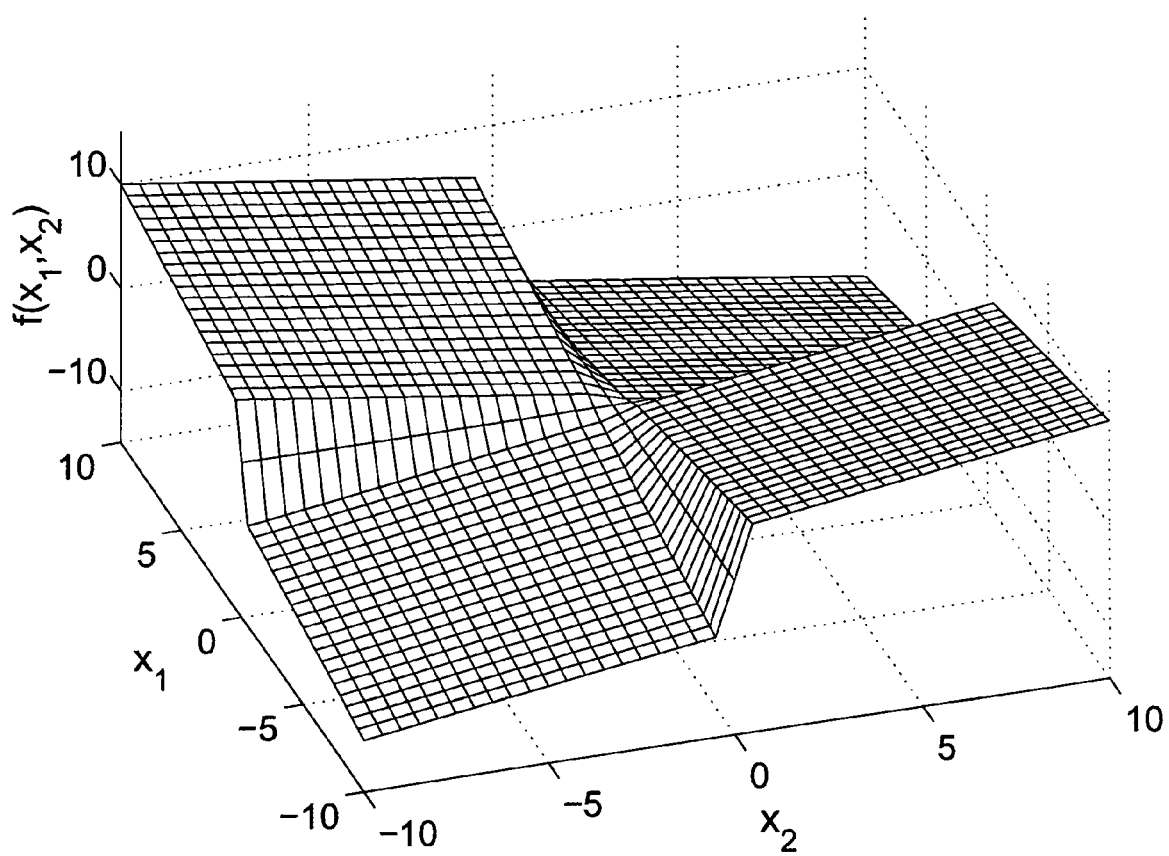
FIG. 2 shows the graph of the feedback function used in the case of the synchronization circuit according to the invention.

The synchronization circuit according to the invention comprises (FIG. 1) an analog feedback shift register 1 and a buffer 2 in front of it. The buffer 2 comprises an adder 3 and a shift register 4 with 1023 memory locations for analog values. The output of the shift register 4 is fed back to the second input of the adder 3. The analog feedback shift register 1 comprises an adder 5 and an analog shift register 6 with ten memory locations. A feedback circuit 7 is connected to taps at the tenth memory location and at a further memory location or a plurality of further memory locations. In the example, corresponding to (4), only one further tap is present at the third memory location. In the feedback circuit 7, the tapped analog values are combined according to a feedback function. The graph of a possible feedback function with two arguments $f(x_1,x_2)$ is shown in FIG. 2. The output of the feedback circuit 7 is connected via a gain block 8 to the second input of the adder 5.

The output of the gain block 8 is moreover connected to a discriminator 9 which comprises a squaring circuit or another circuit mapping the input signal into the positive domain, a low-pass filter and a threshold value detector and outputs a binary signal. The discriminator may also be connected to any other point of the loop formed by the shift register 6, the feedback circuit 7, the gain block 8 and the adder 5.

The input signal is present as a digital signal of a specific bit resolution, e.g. 12 bit for the magnitude and an additional bit for the sign. The values may be represented as floating point numbers or as integers. However, they are designated below as analog values for distinction from binary values. The input signal contains a binary sequence which can be generated by a binary feedback shift register which has the same feedback pattern as the analog feedback shift register 1, i.e. in the case presented a feedback pattern in which in each case the new value is generated by logical operation according to (4). However, there may be a very strong background noise, the typical signal/noise ratio being, for example, −35 dB.

The analog values of the input signal, which are elements of an input sequence, first enter the buffer 2. There, a plurality, for example, twenty, instances of consecutively determined sequences of in each case 1023 values, each of which corresponds to a fundamental sequence with added background noise—which after all is sent twenty times in succession for transmitting one data bit—are superposed, i.e. the 1023 analog values of the first instance which correspond to the chips of the fundamental sequence are stored in the memory locations of the shift register 4 and then fed back sequentially to the adder 5, and the corresponding values of the second instance are added thereto and the original value is overwritten with the result. This is repeated until the sum of the twenty instances is stored in the shift register 4.

Since, in the summation, the noise is superposed only in an uncorrelated manner, a substantial improvement of the signal/noise ratio can be achieved thereby. If, however, the data bit value changes during the summation and the corresponding fundamental sequence is inverted, the summation can also lead to partial cancellation. In this case, however, no synchronization occurs within a specific time span with regard to this fundamental sequence which then leads to termination and filling of the shift register 4 with new data, as will be explained further below.

The basic sequence stored in the buffer 2 is now read out repeatedly for generating an external sequence and in each case fed to the input of the analog shift register 1. Since the fundamental sequence may be inverted by logical combination with the data bit, two analog shift registers can also be used, the external sequence being fed via an inverter to one of them.

That analog feedback shift register 1 which receives an advantageous sequence, i.e. one which contains a component as similar as possible to the coded fundamental sequence $p_1, \ldots, p_{1023}$, should now generate therefrom an internal sequence $a_1, \ldots, a_{1023}$ which corresponds to this fundamental sequence and which should moreover agree with the external sequence in terms of the phase position. The external sequence corresponds to repetitions of the basic sequence which contains the fundamental sequence $p_1, \ldots, p_{1023}$ with background noise added.

For the stability and the synchronization behaviour in the case of large negative signal/noise ratios, the choice of a suitable feedback function f is of considerable importance. With the functions known to date, it has not been possible to achieve any synchronization in the case of sequences with a high background noise. In the search for more suitable feedback functions, various features have proved advantageous. Thus, in the chosen representation of the binary values—in other representations some of the properties have to be appropriately transformed—they should as far as possible have the following properties:

The feedback function should substantially be a linear combination of the arguments in each sector which is defined by specific values of the sign of the arguments. The resulting discontinuities at the sector limits can be smoothed, but it has been found that such modifications tend to adversely affect the behaviour and therefore should not be large.

If the magnitudes of the arguments are 1, the magnitude of the feedback value should be slightly less than 1, preferably between 0.90 and 0.99. It is advantageous if the feedback function gives a value of magnitude 1 in the case of arguments of magnitude 1, i.e.

$$|f(x_1, \ldots, x_m)|=1 \text{ for } |x_1|= \ldots =|x_m|=1, \tag{5}$$

and the function value is then multiplied by a selectable factor k<1, in particular 0.90<k<0.99. This multiplication is performed by the adjustable gain block 8, which follows the feedback circuit 7 evaluating the feedback function.

The sign of the feedback function should in each case the inverse of the sign of the product of the negative arguments, i.e.

$$\text{sig}(f(x_1, \ldots, x_m))=-\text{sig}((-x_1) \cdot \ldots \cdot (-x_m)). \tag{6}$$

If $x_1, \ldots, x_m$ each have the magnitude 1, i.e. can also be regarded as binary quantities, said two properties result in $f(x_1, \ldots, x_m)$ corresponding to the logical combination $x_1 \oplus \ldots \ominus x_m$.

It is furthermore advantageous if the feedback function f is invariant on interchanging the arguments. It should be antisymmetrical and monotonic as a function of each individual argument, i.e. when other arguments are kept constant.

A feedback function f which has all the abovementioned properties and with which synchronization could be achieved even in the case of signals with a strong background noise is $$f(x_1, \ldots, x_m)=-\text{sig}((-x_1) \cdot \ldots \cdot (-x_m)) \cdot (|x_1|+ \ldots +|x_m|)/m \tag{7}$$

Apart from scaling which ensures that (5) is fulfilled, this function is, in each sector, a linear combination of the arguments with a coefficient of +1 or −1.

For two variables, i.e.

$$f(x_1,x_2)=-\text{sig}(x_1 \cdot x_2) \cdot (|x_1|+|x_2|)/2, \tag{8}$$

it is shown in FIG. 2, only the transitions at the sector limits having been smoothed by linear interpolation.

If a representation of binary values other than that in the example described is chosen, the conditions must be appropriately adapted to the feedback function. Furthermore, the factor k can, depending on implementation as a fixed or variable quantity, be integrated into the feedback function, which, for example, would require adaptation of the condition (5).

Figure 4:
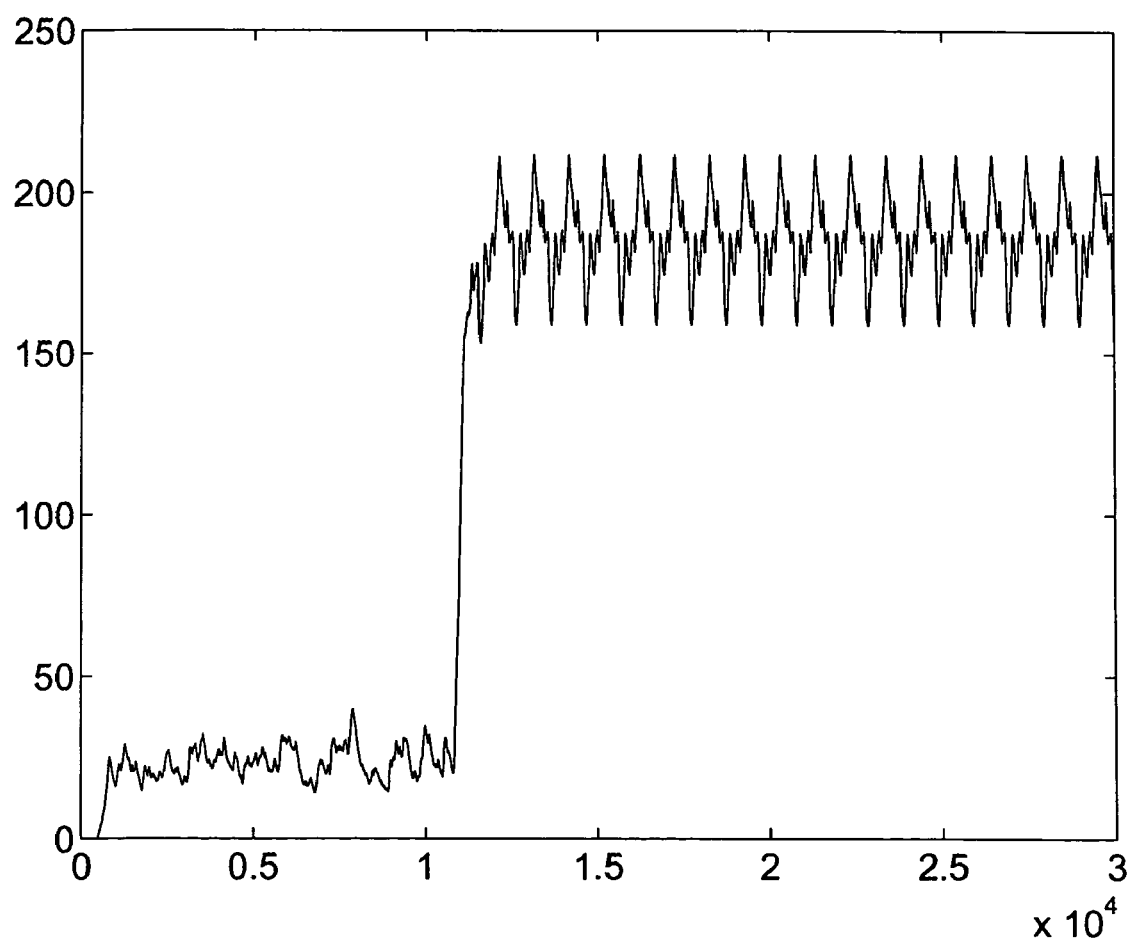

Since, thanks to the buffer 2, the synchronization circuit operates with stored data, its operating speed is independent of the chip rate of the received signal and may be substantially higher. The power of the internal sequence generated, which is tapped at the output of the gain block 8, serves as a criterion for successful synchronization. While the elements of the internal sequence have about the same value as those of the external sequence before synchronization, the latter is amplified after synchronization by a factor of $1/(1-k)$ which is thus usually between 10 and 100. The power of the internal sequence $(a_i)$ accordingly increases greatly, as shown in FIG. 4. This increase is registered by the discriminator 9, in which the power is determined by squaring and smoothed by filtering through a low-pass filter and averaged over a relatively long time segment and finally the result compared with a threshold value. A corresponding binary signal which indicates the completed synchronization is output.

If no synchronization occurs after a certain time, there is generally no sense in continuing the procedure with the same data. The lack of synchronization may be accidental, for example due to a particularly unfavourable form of the noise component, due to an unfavourable phase position of the received signal or due to an unfavourable sampling time before a data bit change, which leads to instances of sequences in which the component containing the desired fundamental sequence occurs with different signs being added in the buffer 2 (FIG. 1), which can lead to a serious attenuation of said component compared with the noise component. In such cases, it is expedient to fill the buffer 2 with a new basic sequence and to restart the synchronization process with it.

There are of course various possible deviations from the example described. Thus, especially in the case of good quality of the input signal, the buffer need not be present and the input sequence can be fed directly as an external sequence to the input of the analog feedback shift register. There are also various possibilities for implementation; in particular, different degrees of integration can be chosen. The stated parts of the synchronization circuit need by no means be present as separate components. The shift register can, for example, be formed in each case by a corresponding memory with linear addressing and a write pointer and a read pointer.

LIST OF REFERENCE SYMBOLS

1 Analog feedback shift register
2 Buffer
3 Adder
4 Shift register
5 Adder
6 Shift register
7 Feedback circuit
8 Gain block
9 Discriminator

The invention claimed is:

1. Synchronization circuit for processing an external sequence of analog values which is derived from an input sequence, the circuit comprising:
an analog feedback shift register including a shift register having memory locations configured to store analog values that are combined according to a specific feedback pattern to produce a feedback value according to a feedback function, from which a new input value is generated by superposition with a new element of the external sequence, the new input value is fed to the input of the shift register, and the feedback function is substantially a linear combination of arguments associated with each of plural sectors, wherein each of the plural sectors is a portion of an argument space in which the signs of the arguments have predetermined values.

2. Synchronization circuit according to claim 1, wherein the magnitude of the feedback function is 1 if the magnitudes of the arguments are each 1.

3. Synchronization circuit according to claim 1 or 2, wherein the sign of the feedback function always corresponds to the sign of the combination of the arguments.

4. Synchronization circuit according to claim 1, wherein the feedback function is invariant when the arguments are interchanged.

5. Synchronization circuit according to claim 1, wherein the feedback function as a function of each argument is antisymmetrical and monotonic.

6. Synchronization circuit according to claim 1, wherein the magnitude of the feedback function substantially corresponds to the mean value of the magnitudes of the arguments.

7. Synchronization circuit according to claim 1, wherein the feedback value is produced by multiplying the value of the feedback function by a factor $k<1$, which is preferably between 0.90 and 0.99.

8. Synchronization circuit according to claim 1, further comprising a feedback circuit configured to evaluate the feedback function and a gain block for multiplying an initial value of the feedback circuit with a factor and an adder configured to superpose the factor multiplied initial feedback value with a new element of the external sequence.

9. Synchronization circuit according to claim 8, further comprising a discriminator configured to generate a binary output signal indicating completed synchronization, the input of which is connected to the output of the feedback circuit and which preferably comprises a squaring circuit or another circuit mapping an input signal into the positive domain, a low-pass filter and a threshold value detector.

10. Synchronization circuit according to claim 1, further comprising a buffer in front of the analog feedback shift register, the buffer configured to add successive segments of an input sequence, each of which contains a fundamental sequence.

11. Synchronization circuit according to claim 10, wherein the buffer comprises a shift register and an adder in front of the shift register, the adder configured to add a member of the input sequence to an output value of the shift register.

* * * * *